US012123663B2

(12) United States Patent
Stickland et al.

(10) Patent No.: US 12,123,663 B2
(45) Date of Patent: Oct. 22, 2024

(54) HEAT EXCHANGER

(71) Applicant: DENSO Marston Ltd., Shipley (GB)

(72) Inventors: Mark Stickland, West Yorkshire (GB); Mario Ciaffarafa, West Yorkshire (GB); Charith Jayatunga, West Yorkshire (GB)

(73) Assignee: DENSO Marston Ltd., Shipley (GB)

( * ) Notice: Subject to any disclaimer, the term of this patent is extended or adjusted under 35 U.S.C. 154(b) by 210 days.

(21) Appl. No.: 17/960,877

(22) Filed: Oct. 6, 2022

(65) Prior Publication Data

US 2023/0023039 A1 Jan. 26, 2023

Related U.S. Application Data

(63) Continuation of application No. PCT/GB2021/050859, filed on Apr. 8, 2021.

(30) Foreign Application Priority Data

Apr. 9, 2020 (GB) ..................................... 2005332

(51) Int. Cl.
*F28F 9/00* (2006.01)
*F28D 7/16* (2006.01)
*F28D 21/00* (2006.01)
*F28F 9/02* (2006.01)

(52) U.S. Cl.
CPC ............ *F28F 9/001* (2013.01); *F28D 7/1661* (2013.01); *F28F 9/0265* (2013.01); *F28D 2021/0082* (2013.01)

(58) Field of Classification Search
CPC ............ F28D 2021/0082; F28D 7/1661; F28F 9/0265; F28F 9/001

USPC ........................................................ 165/159
See application file for complete search history.

(56) References Cited

U.S. PATENT DOCUMENTS

| 7,669,645 B2 * | 3/2010 | Nakamura | F28D 9/0025 165/157 |
|---|---|---|---|
| 10,337,807 B2 * | 7/2019 | Richter | F28D 7/1692 |
| 11,585,604 B2 * | 2/2023 | Ciaffarafa | F28D 9/0062 |
| 11,604,036 B2 * | 3/2023 | Kolder | F28D 7/1684 |
| 2012/0292002 A1 * | 11/2012 | Saumweber | F02B 29/0475 165/164 |

(Continued)

FOREIGN PATENT DOCUMENTS

EP 3567331 A1 11/2019
WO WO-2011061090 A2 5/2011

*Primary Examiner* — Jon T. Schermerhorn, Jr.
(74) *Attorney, Agent, or Firm* — Harness, Dickey & Pierce, P.L.C.

(57) ABSTRACT

A heat exchanger includes a core having a plurality of tubes, each tube having a tube inlet and a tube outlet, and the tube inlets define an inlet plane and the tube outlets define an outlet plane. The tubes are spaced from one another for receiving a second fluid therebetween, for heat transfer between the first and second fluids. A jacket is provided adjacent the core for use in containing the second fluid, and the jacket comprises a jacket inlet for passage of the second fluid en route to the core. The jacket extends between the inlet plane and the outlet plane, and the jacket inlet is offset from the inlet plane towards the outlet plane. The heat exchanger further comprises a deflector arrangement for directing a flow of second fluid from the jacket inlet towards the inlet plane prior to entering the core.

19 Claims, 5 Drawing Sheets

(56) References Cited

U.S. PATENT DOCUMENTS

2019/0346218 A1    11/2019  Barata
2020/0033074 A1     1/2020  Benjamin et al.
2023/0271479 A1*    8/2023  Szostek ................ F24H 3/0429
                                                         392/360

* cited by examiner

HEAT EXCHANGER

CROSS REFERENCE TO RELATED APPLICATION

The present application is a continuation application of International Patent Application No. PCT/GB2021/050859 filed on Apr. 8, 2021, which designated the U.S. and claims the benefit of priority from GB Patent Application No. 2005332.8 filed on Apr. 9, 2020. The entire disclosures of all of the above applications are incorporated herein by reference.

FIELD OF THE INVENTION

The present disclosure relates to a heat exchanger.

BACKGROUND OF THE INVENTION

Heat exchangers are a type of apparatus configured for transferring heat from one fluid to another fluid. A common type of heat exchanger is a tube-type heat exchanger in which a first fluid flows through a plurality of tubes, which are typically encased in a jacket. A second fluid flows through the jacket (i.e. across the tubes) so that heat from the first fluid can be transferred from the first fluid to the second fluid, or vice versa (e.g. via thermal conduction through the walls of the tubes and convection through the fluids).

SUMMARY

According to an aspect of the present disclosure, a tube type heat exchanger includes:
- a core having a plurality of tubes, each tube having a tube inlet and a tube outlet, wherein the tube inlets define an inlet plane and the tube outlets define an outlet plane, wherein the core is configured to transfer a first fluid in a flow direction from the inlet plane to the outlet plane via the plurality of tubes, and wherein the tubes are spaced from one another for receiving a second fluid therebetween, for heat transfer between the first and second fluids;
- a jacket provided adjacent the core for use in containing the second fluid, wherein the jacket comprises a jacket inlet for passage of the second fluid en route to the core and a jacket outlet for expelling the second fluid from the core, wherein the jacket extends between the inlet plane and the outlet plane, and wherein the jacket inlet is offset from the inlet plane towards the outlet plane; and
- a deflector arrangement for directing a flow of the second fluid from the jacket inlet towards the inlet plane prior to entering the core.

DETAILED DESCRIPTION

Figure 1:
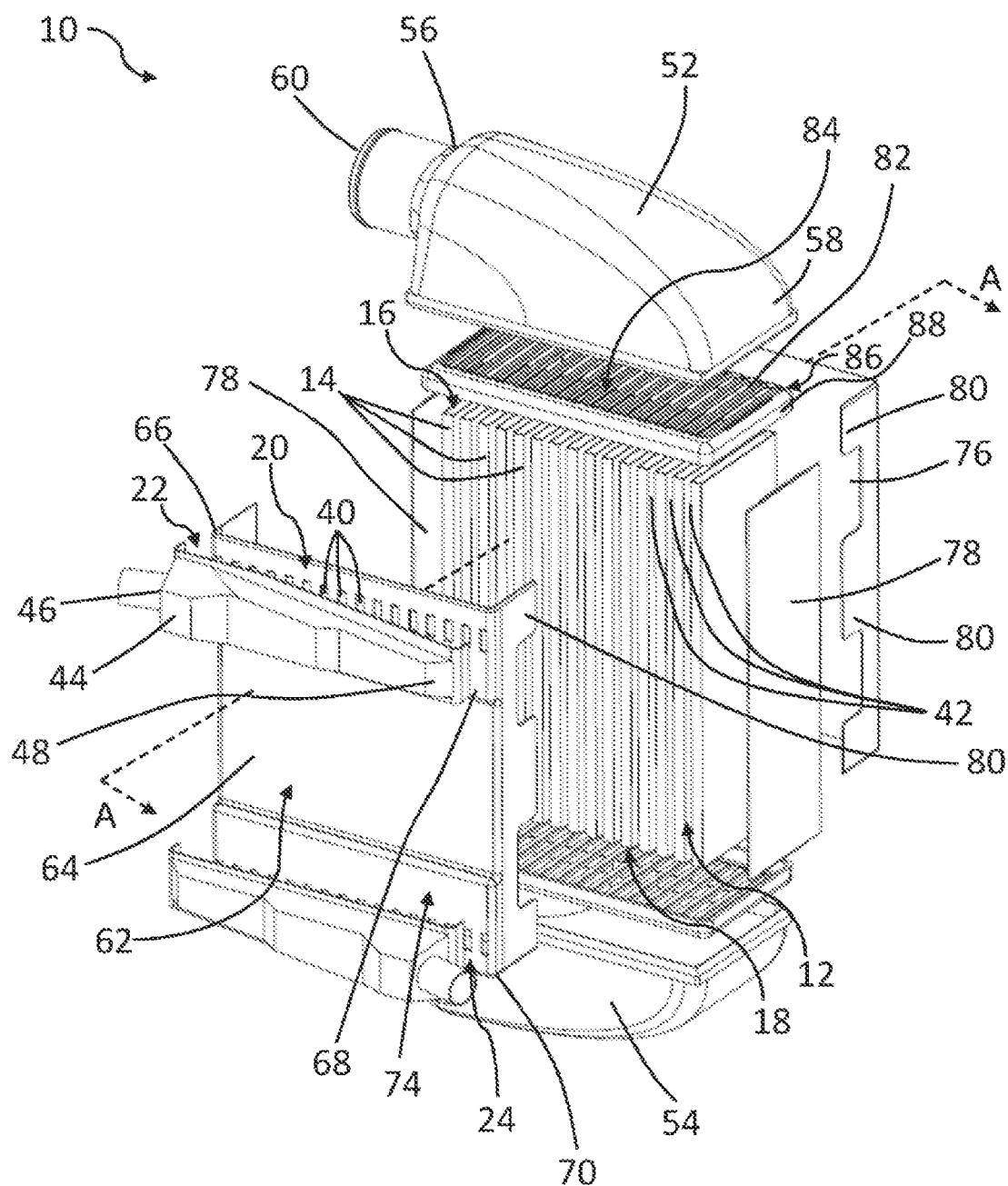
FIG. 1 is an exploded isometric view of a heat exchanger according to an embodiment.

To begin with, examples of relevant techniques will be described. Heat exchangers are a type of apparatus configured for transferring heat from one fluid to another fluid. A common type of heat exchanger is a tube-type heat exchanger in which a first fluid flows through a plurality of tubes, which are typically encased in a jacket. A second fluid flows through the jacket (i.e. across the tubes) so that heat from the first fluid can be transferred from the first fluid to the second fluid, or vice versa (e.g. via thermal conduction through the walls of the tubes and convection through the fluids).

A charge air cooler is a type of heat exchanger which is used to cool compressed air (e.g. from a turbocharger) before it enters an engine, where the cooling medium is air or liquid. Typically, liquid cooled charge air coolers are tube-type heat exchangers in which hot charge air flows through the plurality of tubes, while liquid coolant flows through the jacket surrounding the tubes. Often, the temperature of the charge air entering the tubes is higher than the boiling temperature of the liquid coolant in the jacket, which can cause boiling of the liquid coolant in regions close to the inlet of the charge air tubes. Boiling of coolant causes expansion of gas bubbles, which then collapse rapidly, causing regions of erosion of the heat exchanger surface (e.g. tube or jacket surfaces). Over time, this process can lead to leakage and failure.

The present disclosure seeks to overcome, or at least mitigate, one or more problems of the prior art.

According to a first aspect of the present disclosure, a tube type heat exchanger is provided, the tube type heat exchanger comprising:
- a core having a plurality of tubes, each tube having a tube inlet and a tube outlet, wherein the tube inlets define an inlet plane and the tube outlets define an outlet plane, wherein the core is configured to transfer a first fluid in a flow direction from the inlet plane to the outlet plane via the plurality of tubes, and wherein the tubes are spaced from one another for receiving a second fluid therebetween, for heat transfer between the first and second fluids;
- a jacket provided adjacent the core for use in containing the second fluid, wherein the jacket comprises a jacket inlet for passage of the second fluid en route to the core and a jacket outlet for expelling the second fluid from the core, wherein the jacket extends between the inlet plane and the outlet plane, and wherein the jacket inlet is offset from the inlet plane towards the outlet plane;
- the heat exchanger further comprising a deflector arrangement for directing a flow of the second fluid from the jacket inlet towards the inlet plane prior to entering the core.

In typical tube type heat exchangers, the jacket inlet has to be offset from the inlet plane towards the outlet plane in order to accommodate interaction between a header plate and the jacket. In heat exchangers where the first fluid is a hot fluid (e.g. charge air) and the second fluid is a coolant (e.g. water), the offset inlet means that the second fluid is introduced into the core at a distance below the inlet plane. This can result in a low velocity region of second fluid flow occurring below the inlet plane. When the temperature of the first fluid (e.g. hot charge air) is greater than the boiling temperature of the second fluid, a low velocity region of the second fluid can lead to boiling of the second fluid, which can lead to damage of the heat exchanger. Provision of the deflector arrangement promotes flow of the second fluid from the jacket inlet towards the inlet plane, which can reduce the risk of a low velocity region of the second fluid occurring adjacent the inlet plane. This reduces the likelihood of the second fluid boiling close to the inlet plane, and so can protect the heat exchanger from associated damage.

In exemplary embodiments, the deflector arrangement defines one or more core openings through which second fluid is intended to flow in order to enter the core, wherein the jacket inlet comprises one or more inlet apertures upstream of said core openings, wherein the one or more core openings are arranged to be at least partially offset from the one or more inlet apertures in a direction towards the inlet plane.

Having one or more core openings which are at least partially offset from the one or more inlet apertures in a direction towards the inlet plane ensures that second fluid passing through the one or more inlet apertures has to change direction towards the inlet plane in order to pass through the one or more core openings. This ensures a high velocity flow of second fluid close to the inlet plane, which reduces the risk of boiling second fluid in this region.

In exemplary embodiments, the deflector arrangement comprises one or more deflector members provided between the jacket inlet and the core.

Providing one or more deflector members between the jacket inlet and the core ensures that the second fluid comes into contact with or is influenced by the one or more deflector members prior to entering the core, helping to direct flow towards the inlet plane.

In exemplary embodiments, the core defines a height parallel to a flow axis of the tubes and a width transverse to said flow axis of the tubes, wherein the deflector arrangement is arranged such that the second fluid is influenced in the direction of the inlet plane as it flows from the jacket inlet across substantially the entire width of the core.

Having one or more deflector members arranged such that the second fluid is directed from the jacket inlet to the inlet plane across substantially the entire width of the core reduces the likelihood of boiling second fluid (e.g. due to low velocity regions of second fluid forming close to the inlet plane) across the entire width of the core.

In exemplary embodiments, the one or more deflector members comprise a deflector plate extending across the width of the core.

Use of a deflector plate (i.e. a single piece) provides a simple and easy means of directing flow towards the inlet plane.

In exemplary embodiments, the one or more deflector members each comprise a fixed end and a free end, wherein the fixed end is connected to the jacket, and wherein said one or more core openings are defined between the free end and the inlet plane so that a flow of second fluid is directed to the core through said one or more core openings.

Having an opening defined between the free end and the inlet plane provides a fluid communication between the jacket inlet and a region of the core proximal the inlet plane. Furthermore, having the fixed end connected to the jacket ensures that there is no fluid communication between the jacket inlet and the core proximal the fixed end. Therefore, all of the second fluid flowing through the jacket inlet (particularly a flow of second fluid close to the fixed end) is diverted through the opening(s) defined by the free end(s) of the deflector member(s) (i.e. directed towards the inlet plane). This ensures a high velocity flow of second fluid close to the inlet plane, which reduces the risk of boiling second fluid in this region.

In exemplary embodiments, the distance between the or each free end and the inlet plane is in the range of 5 mm to 25 mm.

Narrowing the distance between the free end(s) and the inlet plane (i.e. narrowing the width of said one or more core opening) reduces the risk of second fluid boiling, but increases the second fluid pressure drop. In the context of automotive charge air coolers, it has been found than distances between the free end(s) and the inlet plane (i.e. core opening widths) in the range of 5 mm to 25 mm offer an optimum trade-off between boiling risk and pressure drop for a variety of typical heat exchanger configurations of the type commonly used in automotive or industrial engines of around 100 hp to 500 hp. In other embodiments with different heat exchanger sizes, it will be understood that other distances between the free end(s) and the inlet plane (i.e. other core opening widths) would be suitable.

In exemplary embodiments, the one or more deflector members comprise one or more deflector apertures or slits, wherein the one or more deflector apertures or slits define said one or more core openings.

Having one or more deflector apertures or slits (e.g. a series of slits or apertures aligned with gaps between the plurality of tubes) allows fluid to enter the core, but for the deflector member(s) to extend all the way to the inlet plane between said one or more deflector apertures or slits. This may allow a first end of the deflector member(s) to be secured to a header plate or other component proximal the inlet plane (e.g. via brazing), which reduces the likelihood of the deflector member(s) being moved from its intended position.

In exemplary embodiments, the or each deflector member is arranged in sealing contact with the core for preventing second fluid entering the core other than through said core opening(s).

Having the deflector member(s) arranged in sealing contact with the core for preventing second fluid entering the core other than through said core opening(s) maximises the flow of second fluid from the jacket inlet towards the inlet plane, reducing the generation of low velocity flow regions and the risk of boiling of the second fluid.

In exemplary embodiments, the or each deflector member comprises a fixed end connected to the jacket and a second end, wherein the or each deflector member defines a core interface surface between said fixed and second ends, and wherein said core interface surface is in abutment with the core for preventing the second fluid entering said core away from said one or more core openings.

Having the core interface surface(s) in abutment with the core provides a convenient means for preventing second fluid entering the core away from the opening(s). Furthermore, by having the entire core interface surface(s) in abutment with the core (rather than just the second end) the deflector member(s) is supported by the core, which reduces the likelihood that the deflector member(s) will deform so that a gap is created between the free end(s) and the core.

In exemplary embodiments, the one or more deflector members each comprise a fixed end and a free end, wherein the or each fixed end is connected to the jacket, wherein the or each free end is profiled to direct a flow of the second fluid from the jacket inlet towards the inlet plane.

Having a free end profiled to direct a flow of second fluid from the jacket inlet towards the inlet plane reduces the generation of low velocity flow regions and the risk of boiling of the second fluid.

In exemplary embodiments, the one or more deflector members each comprise a fixed end and a free end, wherein the or each fixed end is connected to the jacket, wherein the or each free end is profiled to improve uniformity of second fluid flow distribution across said core.

Improving the uniformity of second fluid flow distribution across said core increases the durability of the core.

In exemplary embodiments, the or each free end may be a flat portion of the deflector member.

Having the free end(s) as a flat portion of the deflector member(s) provides for simple manufacturing of the deflector member(s) (e.g. in the case of a deflector plate, there is no need to modify the free end via machining, additive manufacturing or the like).

In exemplary embodiments, the heat exchanger is configured to define a gap between the jacket inlet and the one or more deflector members.

By arranging the heat exchanger so that a gap is formed between the jacket inlet and the deflector member(s), the deflector member(s) does not merely reduce the size of the jacket inlet (as it would if flush against the jacket inlet), which may not result in a significant change in direction of the second fluid flow. Rather, a flow of second fluid passes through the entire jacket inlet into the gap, which then has to change direction to pass through the opening(s) between the free end(s) of the deflector member(s) and the inlet plane. This ensures that the second fluid flow is directed towards the inlet plane by the deflector member(s), which ensures a high velocity flow of second fluid close to the inlet plane (preventing boiling of second fluid in this region).

In exemplary embodiments, a core-jacket interface plane is defined between the core and the jacket, wherein the jacket inlet is spaced apart from said core-jacket interface plane.

Spacing the jacket inlet apart from the core-jacket interface plane (i.e. providing a gap between the jacket inlet and the core-jacket interface plane) provides a convenient means for forming a gap between the jacket inlet and the deflector member(s) (e.g. via positioning the deflector member(s) adjacent the core-jacket interface plane), in order to direct second fluid from the jacket inlet, through the gap and the opening(s) to the region of the core adjacent the inlet plane. This ensures a high velocity flow of second fluid close to the inlet plane, which reduces the risk of boiling second fluid in this region.

In exemplary embodiments, the core defines a height extending in a direction parallel to a flow axis of the tubes and a width extending transverse to said flow axis, wherein the jacket inlet is elongate and extends across the width of the core.

Having a jacket inlet which extends across the width of the core allows second fluid to be introduced across the entire width of the core, which ensures the second fluid is directed via the deflector arrangement to the entire width of the inlet plane. This reduces the formation of low velocity regions of second fluid across the entire width of the inlet plane and increases the heat transfer capabilities over a heat exchanger with a shorter jacket inlet.

In exemplary embodiments, the jacket inlet comprises a plurality of inlet apertures distributed across the width of the core, or a single inlet aperture extending across the width of the core.

Having one or more inlet apertures provides a convenient means of transferring second fluid through the jacket inlet into the core. Furthermore, a plurality of inlet apertures distributed across the width of the core, or a single inlet aperture extending across the width of the core ensures that the second fluid can be directed via the deflector arrangement across the entire width of the inlet plane.

In exemplary embodiments, the plurality of tubes spaced from one another define a series of tube gaps therebetween, wherein said plurality of inlet apertures are aligned with said tube gaps.

Having a plurality of inlet apertures aligned with the tube gaps ensures that the second fluid is directed via the deflector arrangement to each of the tube gaps proximal the inlet plane. This ensures that second fluid is distributed along the entire inlet plane (i.e. there are no tube gaps which do not receive sufficient second fluid) which reduces the likelihood of boiling second fluid close to the inlet plane.

In exemplary embodiments, the jacket inlet comprises a second fluid channel configured to be aligned with said one or more inlet apertures, the second fluid channel having a first channel end and a second channel end, wherein the first channel end comprises a channel opening, and wherein the depth of the second fluid channel decreases from the first channel end to the second channel end.

Having the depth of the second fluid channel decreasing from the channel opening/first channel end to the second channel end ensures an even flow velocity of the second fluid along the channel as the flow volume of the second fluid in the channel reduces due to second fluid entering the core via the inlet apertures. This ensures a similar velocity of second fluid flow across the width of the core, which ensures that a similar flow rate of second fluid passes by each of the tubes of the core proximal the inlet plane and reduces the chances of second fluid boiling in this region.

In exemplary embodiments, the heat exchanger further comprises a first fluid inlet tank proximal said inlet plane and a first fluid outlet tank proximal said outlet plane, wherein said plurality of tubes provide a fluid communication between the first fluid inlet tank and the first fluid outlet tank, wherein the first fluid inlet tank comprises a first tank end and a second tank end, wherein the first tank end comprises a tank opening, and wherein the depth of the first fluid inlet tank decreases from the first tank end to the second tank end.

Having the depth of the first fluid inlet tank decreasing from the tank opening/first tank end to the second tank end ensures an even flow velocity of the first fluid along the tank as the flow volume of the first fluid in the tank reduces due to the fluid entering the core via the tubes. This ensures a similar flow rate of first fluid in each of the tubes of the core proximal the inlet plane, which (when combined with an even flow of second fluid across the width of the core) ensures a consistent heat transfer from the first fluid to the second fluid (or vice versa) across a width of the core, and reduces the chances of second fluid boiling close to the inlet plane.

In exemplary embodiments, the first fluid outlet tank is of the same shape and configuration as the first fluid inlet tank.

Having first fluid inlet and outlet tanks of the same shape and configuration provides for simple assembly of the heat exchanger, since the inlet/outlet tanks are interchangeable.

In exemplary embodiments, the jacket has a cranked configuration proximal the inlet plane, whereby the jacket inlet is spaced apart from the core in a direction perpendicular to said flow direction such that the jacket defines a chamber between the jacket inlet and the core, so that second fluid passes through said chamber before entering the core.

By having a cranked configuration whereby the jacket inlet is spaced apart from the core in a direction perpendicular to said flow direction, a space is created between the jacket and the core, in order to accommodate the deflector arrangement.

In exemplary embodiments, said cranked configuration defines a shoulder or step in an outer surface of the jacket.

Such a shoulder or step provides an interfacing surface between the planar surface and the first offset region.

In exemplary embodiments, a core-jacket interface plane is defined between the core and the jacket, wherein the jacket comprises a first wall, the first wall comprising a planar surface configured to be positioned adjacent said core-jacket interface plane, wherein the first wall further comprises a first cranked region which defines said chamber between the core-jacket interface plane.

Such a jacket structure provides a convenient means of offsetting the jacket inlet from the core in order to accommodate the deflector arrangement.

In exemplary embodiments, the deflector arrangement comprises one or more deflector members each comprising a free end and a fixed end connected to the jacket.

Connecting the fixed end(s) of the deflector member(s) to the jacket (e.g. as opposed to connecting it to the core), ensures the deflector member(s) is structurally connected to the jacket inlet. This ensures that the deflector member and the jacket inlet do not become misaligned in assembly, which ensures that second fluid flowing through the jacket inlet is always directed to the inlet plane via the deflector member.

In exemplary embodiments, the jacket outlet is provided at a second end of the first wall, wherein the jacket outlet is of the same shape and configuration as the jacket inlet.

Providing a jacket outlet of the same shape and configuration as the jacket inlet at an opposite end of the first wall, the first wall can be installed around the core either way up. This makes assembly of the heat exchanger quicker and simpler.

In exemplary embodiments, the heat exchanger further comprises a second deflector arrangement proximal the jacket outlet.

By having a second deflector arrangement proximal the jacket outlet, the first wall can be assembled around the core either way up, whilst ensuring that a deflector arrangement is always present to divert second fluid towards the inlet plane.

In exemplary embodiments, wherein said jacket has a cranked configuration proximal the outlet plane, whereby the jacket outlet is spaced apart from the core in a direction perpendicular to said flow direction such that the jacket defines a second chamber between the jacket outlet and the core, so that second fluid passes through said second chamber before leaving the core.

Such a jacket structure provides a convenient means of offsetting the jacket outlet from the core in order to accommodate the second deflector arrangement.

In exemplary embodiments, the first wall of the jacket is formed from a single plate.

Forming the first wall from a single plate (e.g. a plate pressed to form the first offset region) means that there are no joints between regions of the first wall, which provides for simple assembly and sealing of the jacket.

In exemplary embodiments, the heat exchanger is a charge air cooler, wherein said first fluid is charge air.

Charge air coolers are a type of intercooler which are commonly used in automotive and other industries. Compressed charge air is often hotter than the boiling point of typical coolants used in charge air coolers. Therefore, the advantages outlined above are of particular relevance to this type of heat exchanger.

In exemplary embodiments, the heat exchanger is a water cooled charge air cooler, wherein said second fluid is a water-based coolant (e.g. a water/glycol mixture and/or water with rust inhibitors or other additives).

Water-based coolants typically have a boiling temperature of around 100° C. to 128° C. (depending on additives and pressure). This is lower than typical peak charge air temperatures which are around 150° C. to 270° C. Therefore, the advantages outlined above are of particular relevance to this type of heat exchanger.

In exemplary embodiments, the heat exchanger is of metallic material.

Metallic material provides good heat transfer (e.g. via thermal conduction), is capable of being used for high temperature fluids, and provides strength and durability.

In exemplary embodiments, the heat exchanger is of aluminium material.

Aluminium is a lightweight metallic material, which makes it particularly suitable for heat exchangers for automotive applications, where weight savings lead to increased fuel efficiency.

In exemplary embodiments, the jacket further comprises a second wall and side plates connecting the first and second walls.

Such a jacket arrangement is useful for assembly, since the walls and side plates can each be positioned around the core prior to connecting together (e.g. via brazing).

In exemplary embodiments, the first and second walls each comprise one or more tabs configured for connection to the side plates.

Such tabs provide an increased contact area between the walls and side plates, which makes it easier to connect them together (e.g. via brazing).

In exemplary embodiments, the heat exchanger further comprises braze joints between the first wall and the side plates, and between the second wall and the side plates.

By providing such braze joints, the jacket is fixed in position around said core, and sealed to prevent leaking of second fluid from the jacket.

In exemplary embodiments, the heat exchanger further comprises a header plate, the header plate comprising a central region defining an array of apertures in which said tubes are received and an edge region circumferential to said central region, wherein the edge region comprises an engagement formation for connection to a first end of the jacket.

Having an engagement formation for connection to a first end of the jacket provides a means of coupling the header plate, the tubes which are received within the header plate, and the jacket together.

In exemplary embodiments, the heat exchanger further comprises braze joints between the engagement formation of the header plate and the first end of the jacket.

By providing such braze joints between the header plate and the first end of the jacket, the jacket is fixed in position around said core, and sealed to prevent leaking of second fluid from the jacket.

In exemplary embodiments, the engagement formation comprises a flange or lip configured to extend over the first end of the jacket.

By having a flange or lip configured to extend over the first end of the jacket, the first end of the jacket is effectively received within the header plate. When the jacket is made from multiple walls and side plates connected together, receiving first end of the jacket within the header plate during assembly helps to keep the walls and side plates in the correct position prior to fixing them together (e.g. via brazing). Furthermore, the flange or lip provides a greater contact area between the jacket and the header plate than would be provided by a flat header plate. This provides a stronger connection when the header plate and jacket are connected (e.g. via brazing).

In exemplary embodiments, the first end of the jacket comprises a flange or lip extending parallel to said inlet plane, and wherein the engagement formation of the header plate comprises an abutment surface configured for abutment with said flange or lip of the jacket.

Having a flange or a lip on the first end of the jacket provides a greater contact area between the jacket and the header plate than would be provided by a straight-ended jacket. This provides a stronger connection when the header plate and jacket are connected (e.g. via brazing).

According to a second aspect of the present disclosure, a method of producing a tube type heat exchanger according to the first aspect of the present disclosure is provided, the method comprising the steps of:
a) providing a jacket with a jacket inlet and a deflector arrangement adjacent the jacket inlet;
b) fitting the jacket about a core comprising a plurality of tubes;
c) providing a header plate comprising an engagement formation;
d) connecting the jacket to the header plate engagement formation; and
e) creating one or more braze joints between the header plate and the jacket.

Such a method provides a simple means for assembling a tube type heat exchanger according to the first aspect of the present disclosure.

In exemplary embodiments, step c) comprises providing a header plate having a peripheral flange, and step d) comprises inserting the core and the jacket into the header plate such that the flange extends external to the jacket.

By inserting the core and jacket into the header plate such that the flange extends external to the jacket, the first end of the jacket is effectively received within the header plate. When the jacket is made from multiple walls and side plates connected together, receiving first end of the jacket within the header plate during assembly helps to keep the walls and side plates in the correct position prior to fixing them together (e.g. via brazing). Furthermore, the peripheral flange provides a greater contact area between the jacket and the header plate than would be provided by a flat header plate. This provides a stronger connection when the header plate and jacket are connected (e.g. via brazing).

Figure 2:
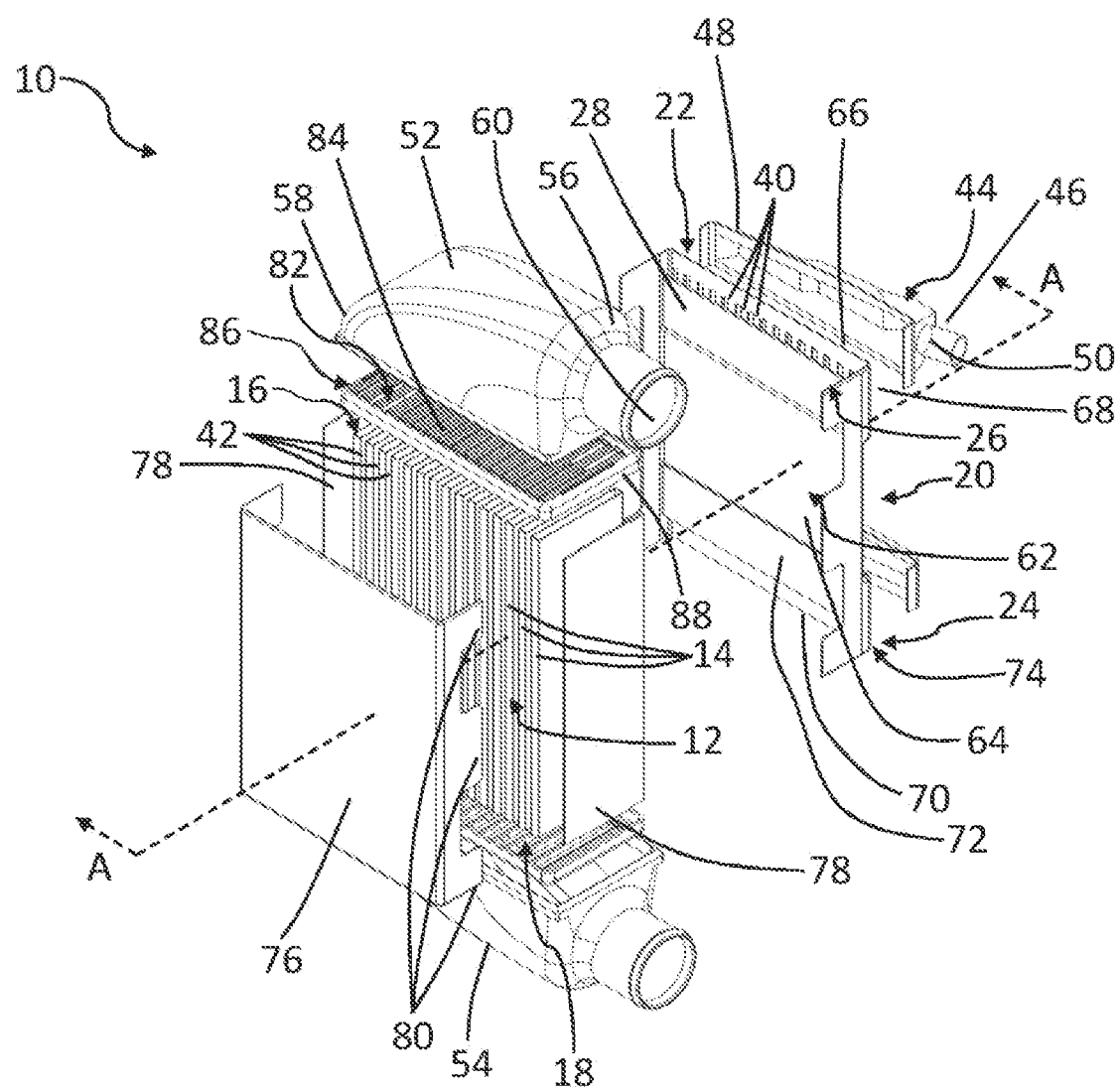
FIG. 2 is a different perspective view of the heat exchanger of FIG. 1.

Referring firstly to FIGS. 1 and 2, a tube type heat exchanger according to an embodiment is indicated at 10. The heat exchanger 10 includes a core 12 having a plurality of tubes 14, each tube 14 having a tube inlet and a tube outlet. The tube inlets define an inlet plane 16 and the tube outlets define an outlet plane 18. The core 12 is configured to transfer a first fluid in a flow direction from the inlet plane 16 to the outlet plane 18 via the plurality of tubes 14, and the tubes 14 are spaced from one another for receiving a second fluid therebetween, for heat transfer between the first and second fluids.

The heat exchanger 10 also includes a jacket 20 provided adjacent the core 12 for use in containing the second fluid. The jacket includes a jacket inlet 22 for passage of the second fluid en route to the core 12 and a jacket outlet 24 for expelling the second fluid from the core 12. The jacket 20 extends between the inlet plane 16 and the outlet plane 18, and the jacket inlet 22 is offset from the inlet plane 16 towards the outlet plane 18.

In this embodiment, the first fluid transferred by the tubes 14 is a hot fluid (e.g. charge air), and the second fluid contained by the jacket 20 is a coolant (e.g. a water-based coolant). However, in alternative embodiments the first fluid may be a coolant and the second fluid may be a hot fluid.

Figure 3:
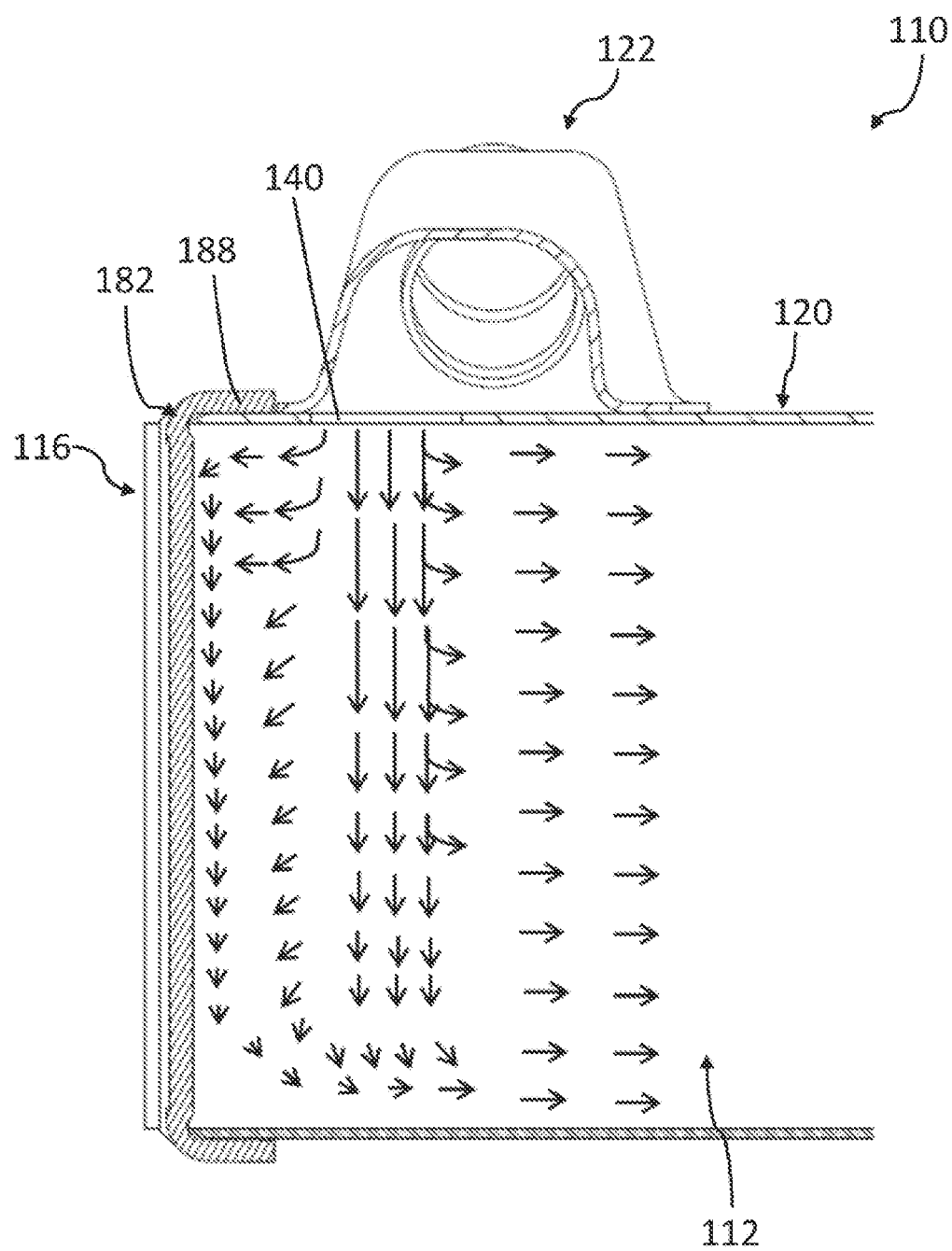
FIG. 3 is a cross section of an inlet portion of a heat exchanger of the prior art.

Referring now to FIG. 3, a cross section of an inlet portion of a prior art heat exchanger similar to that of FIGS. 1 and 2 is indicated at 110. The prior art heat exchanger 110 includes the same components as described so far in relation to FIGS. 1 and 2, which will be given the same numerals with the prefix "1". In this prior art heat exchanger 110, the jacket inlet 122 is offset from the inlet plane 116 towards the outlet plane (not shown) in order to accommodate interaction between a header plate 182 and the jacket 120. In heat exchangers where the first fluid is a hot fluid (e.g. charge air) and the second fluid is a coolant (e.g. a water-based coolant), the offset jacket inlet 122 means that the second fluid is introduced into the core at a distance spaced apart from the inlet plane 116 (e.g. via an inlet aperture 140 in the jacket 120). As can be seen from the sizes of the arrows (which correspond to velocities of second fluid flow), the offset jacket inlet 122 results in a low velocity region of coolant flow occurring adjacent the inlet plane 116 (e.g. as represented by the small length of arrows in this region). When the temperature of the hot fluid (e.g. charge air) is greater than the boiling temperature of the coolant, this low velocity region of coolant can lead to boiling of the coolant, which can lead to damage of the heat exchanger 110.

Figure 4:
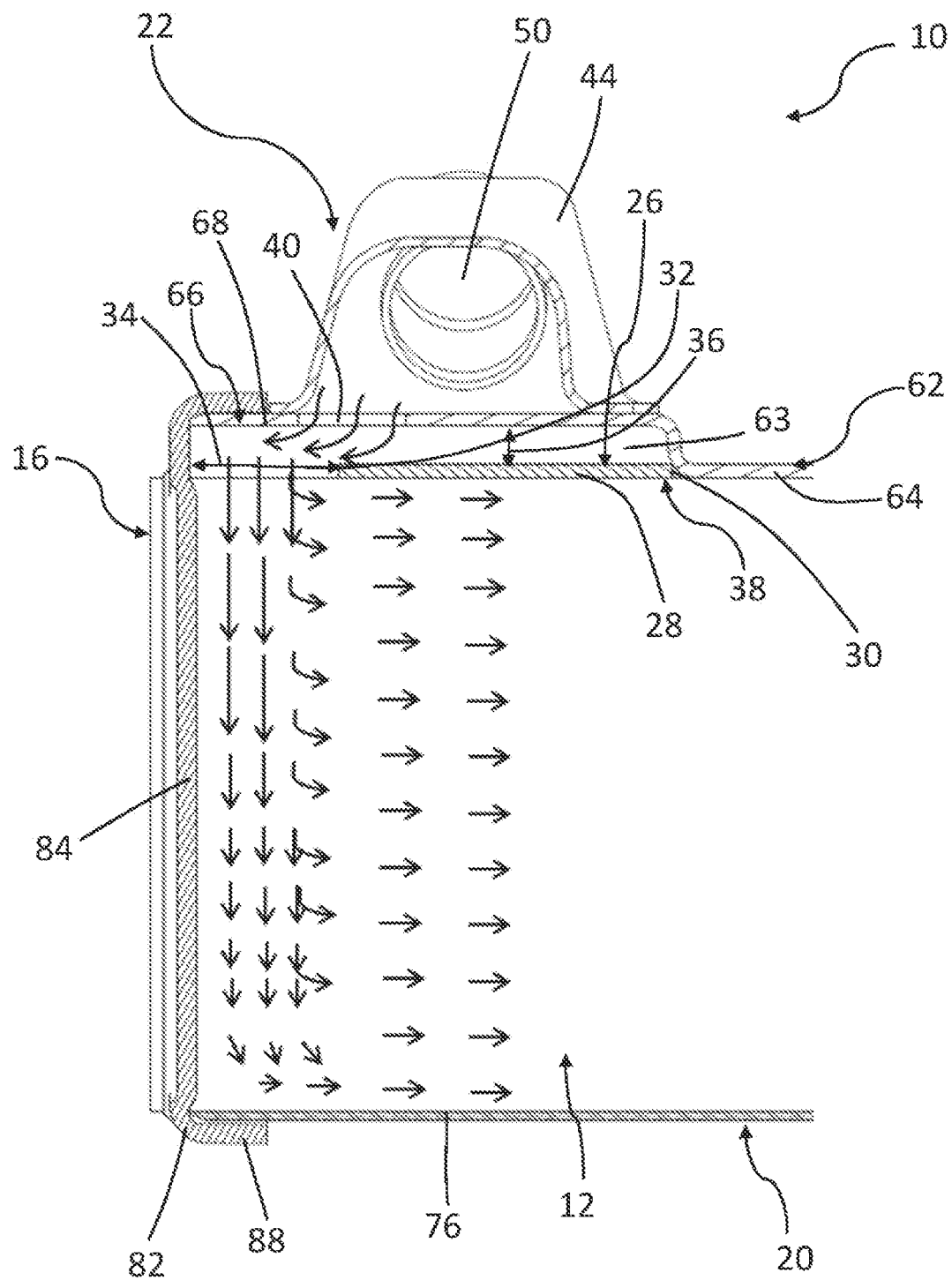
FIG. 4 is a cross section of an inlet portion of the heat exchanger of FIGS. 1 and 2 viewed from direction A-A.

Referring now to FIG. 4, the heat exchanger 10 of FIGS. 1 and 2 also includes a deflector arrangement 26 for directing a flow of the coolant from the jacket inlet 22 towards the inlet plane 16 prior to entering the core 12, as will be described in more detail below. Provision of the deflector arrangement 26 promotes flow of the coolant from the jacket inlet 22 towards the inlet plane 16. This reduces the risk of a low velocity region of coolant occurring adjacent the inlet plane 16 (e.g. as represented by the size of the arrows in this region in comparison to those of FIG. 3). Having such a higher velocity flow of coolant reduces the likelihood of the coolant boiling close to the inlet plane 16, which protects the heat exchanger 10 from associated damage.

As will be described in more detail below, the deflector arrangement 26 defines one or more core openings 34 through which coolant is intended to flow in order to enter the core 12. The jacket inlet 22 includes one or more inlet apertures 40 upstream of the core openings 34. The one or more core openings 34 are partially offset from the plurality of inlet apertures 40 in a direction towards the inlet plane 16. In alternative embodiments, the one or more core openings 34 may be fully offset from the plurality of inlet apertures 40 in a direction towards the inlet plane 16 (i.e. there may be no overlap between the core openings 34 and inlet apertures 40). Having at least a partial offset between the core openings 34 and the inlet apertures 40 ensures that coolant passing through the one or more inlet apertures 40 has to change direction towards the inlet plane 16 in order to pass through the one or more core openings 34, which ensures a high velocity flow of coolant close to the inlet plane 16.

In the illustrated embodiment, the jacket inlet 22 includes a plurality of inlet apertures 40 distributed across the width of the core 12, and the deflector arrangement 26 defines a single core opening 34 extending across the width of the core 12. In alternative embodiments, the jacket inlet 22 may include a single elongate inlet aperture 40 extending across the width of the core 12. In alternative embodiments, the deflector arrangement 26 may define a plurality of core openings 34 distributed across the width of the core 12.

As shown in FIGS. 2 and 4, the deflector arrangement 26 includes a deflector member 28 provided between the jacket inlet 22 and the core 12. In alternative arrangements, two or more deflector members 28 may be provided between the jacket inlet 22 and the core 12 (e.g. a plurality of deflector members 28 each overlapping a single gap between two of the tubes 14 spaced apart from one another). Providing one or more deflector members 28 between the jacket inlet 22 and the core 16 ensures that the coolant comes into contact with or is influenced by the deflector member(s) 28 prior to entering the core 12. This helps to direct flow of coolant towards the inlet plane 16.

As shown in FIG. 2, the core 12 defines a height parallel to a flow axis of the tubes 14 and a width transverse to said flow axis of the tubes 14. In the illustrated embodiment, the deflector member 28 is a deflector plate which extends across the width of the core 12 such that the coolant is influenced in the direction of the inlet plane 16 as it flows from the jacket inlet 22 across substantially the entire width of the core 12. This reduces the likelihood of boiling coolant across the entire width of the core 12. Furthermore, use of a deflector plate (i.e. a single piece) provides a simple and easy means of directing flow towards the inlet plane 12. In alternative embodiments where multiple deflector members are provided, the same effect may be achieved by having the multiple deflector members extend across the width of the core 12 (e.g. each deflector member 28 covering one of the gaps between the tubes 14 spaced apart from one another). Alternatively, multiple deflector members 28 may be distributed along a portion of the length of the core 12, and each deflector member 28 may extend across the width of the core 12.

Referring again to FIG. 4, the deflector member 28 has a fixed end 30 and a free end 32. The fixed 30 end is connected to the jacket 20, and the core opening 34 is defined between the free end 32 and the inlet plane 16 so that a flow of coolant is directed to the core 12 through said core opening 34. Having a core opening 34 defined between the free end 32 and the inlet plane 16 provides a fluid communication between the jacket inlet 22 and a region of the core 12 proximal the inlet plane 16. Furthermore, having the fixed end 30 connected to the jacket 20 ensures that there is no fluid communication between the jacket inlet 22 and the core 12 proximal the fixed end 30. Therefore, all of the coolant flowing through the jacket inlet 22 (particularly a flow of coolant close to the fixed end 30) is diverted through the core opening 34 defined by the free end 32 of the deflector member 28 (i.e. directed towards the inlet plane 16). This ensures a high velocity flow of coolant close to the inlet plane 16, which reduces the risk of boiling coolant in this region.

The distance between the free end 32 and the inlet plane 16 may be in the range of 5 mm to 25 mm. Narrowing the distance between the free end 32 and the inlet plane 16 (i.e. narrowing the width of said core opening 34) reduces the risk of coolant boiling, but increases the coolant pressure drop. It has been found than distances between the free end 32 and the inlet plane 16 (i.e. core opening widths 34) in the range of 5 mm to 25 mm offer an optimum trade-off between boiling risk and pressure drop for a variety of typical heat exchanger configurations of the type commonly used in automotive or industrial engines of around 100 hp to 500 hp. In other embodiments with different heat exchanger sizes, it will be understood that other distances between the free end 32 and the inlet plane 16 (i.e. other core opening widths 34) would be suitable.

In alternative embodiments, the deflector member 28 may extend between the jacket 20 and the inlet plane 16 (i.e. it may have two fixed ends) and the deflector member 28 may include one or more deflector apertures or slits defining the core opening(s) 34. This allows coolant to enter the core 12, but for the deflector member 28 to extend all the way to the inlet plane 16 between the one or more deflector apertures or slits. This may allow a first end of the deflector member 28 to be secured to a header plate 82 or other component proximal the inlet plane 16 (e.g. via brazing), which reduces the likelihood of the deflector member 28 being moved from its intended position.

As will be described in more detail below, the deflector member 28 is arranged in sealing contact with the core 12 for preventing coolant entering the core 12 other than through the opening 34. This maximises the flow of coolant from the jacket inlet 22 towards the inlet plane 16, reducing the generation of low velocity flow regions and the risk of boiling of the coolant. In the illustrated embodiment, the deflector member 28 defines a core interface surface, between the free end 30 and fixed end 32, which is in abutment with the core 12 for preventing the coolant from entering the core 12 away from the opening 34. By having the entire core interface surface in abutment with the core 12 (rather than just a portion proximal the free end 32) the deflector member 28 is supported by the core 12, which reduces the likelihood that the deflector member 28 will deform so that a gap is created between the free end 32 and the core 12. However, in alternative embodiments, the deflector member 28 may be angled (e.g. so that some of the core interface surface is not in abutment with the core 12).

In the illustrated embodiment, the free end 32 is a flat portion of the deflector member 32. However, in alternative embodiments the free end 32 may be profiled to direct a flow of coolant from the jacket inlet 22 towards the inlet plane 16 (e.g. angled towards the inlet plane). In alternative embodiments, the free end 32 may also, or alternatively, be profiled to improve uniformity of coolant flow distribution across the core 12 (e.g. angled to direct coolant along the width of the core 12), which increases the durability of the heat exchanger 10.

As will be described in more detail below, the heat exchanger 10 is configured to define a gap 36 between the jacket inlet 22 and the deflector member 28. This ensures that the deflector member 28 does not merely reduce the size of the jacket inlet 22 (as it would if flush against the jacket inlet 22), which may not result in a significant change in direction of the coolant flow. Rather, a flow of coolant passes through the entire jacket inlet 22 into the gap 36, which then has to change direction to pass through the opening 34. This ensures that the coolant flow is directed towards the inlet plane 16 by the deflector member 28, which ensures a high velocity flow of coolant close to the inlet plane 16 (preventing boiling of coolant in this region).

In the illustrated embodiment, a core-jacket interface plane 38 is defined between the core 12 and the jacket 20, and the jacket inlet 22 being spaced apart from this core-jacket interface plane 38. This provides a convenient means for forming the gap 36 (e.g. via positioning the deflector member 28 adjacent the core-jacket interface plane 38).

In the illustrated embodiment, the jacket 20 has a cranked configuration 61 proximal the inlet plane 16, whereby the jacket inlet 22 is spaced apart from the core 12 in a direction perpendicular to the flow direction from the inlet plane 16 to the outlet plane 18. In this way, the jacket 20 defines a chamber 63 between the jacket inlet and the core, so that coolant passes through the chamber 63 before entering the core. As previously mentioned, the deflector arrangement 26 (i.e. deflector member 28) is provided between the core 12 and the jacket inlet 22 (i.e. within or defining an edge of the chamber 63). The cranked configuration 61 defines a shoulder in an outer surface of the jacket 20.

The jacket 20 has a first wall 62 having a planar surface 64 configured to be positioned adjacent the core-jacket interface plane 38. The jacket inlet 22 is provided at a first end 66 of the first wall. The first wall 62 also includes a first cranked region 68 which defines the chamber 63 between the core-jacket interface plane 38 and the jacket inlet 22.

In the illustrated embodiment, the fixed end 30 of the deflector member 28 is connected to the first wall 62. In this way, the deflector member 28 is structurally connected to the jacket inlet 22 (which is provided on the first offset region 68 of the first wall 62). This ensures that the deflector member 28 and the jacket inlet 22 do not become misaligned in assembly, which ensures that coolant flowing through the jacket inlet 22 is always directed to the inlet plane 16 via the deflector member 28.

In the illustrated embodiment, the deflector member 28 is co-planar with the planar surface 64. In alternative embodiments, the deflector member 28 may be angled (e.g. the fixed end 30 may be connected to the shoulder between the planar surface 64 and the first offset region 68).

Referring again to FIGS. 1 and 2, the jacket outlet 24 is provided at a second end 70 of the first wall 62. The jacket outlet 24 is of the same shape and configuration as the jacket inlet 22, which is described in more detail below. Providing a jacket outlet 24 of the same shape and configuration as the jacket inlet 22, and at an opposite end of the first wall 62 means that the first wall 62 can be installed around the core 12 either way up. This makes assembly of the heat exchanger 10 quicker and simpler. In alternative embodiments, the jacket outlet 24 may be of different shape and configuration (e.g. the jacket outlet 24 may have a constant depth along its length).

The heat exchanger 10 includes a second deflector arrangement 72 proximal the jacket outlet 24 (as shown on FIG. 2). By having a second deflector arrangement 72 proximal the jacket outlet 24, the first wall 62 can be assembled around the core 12 either way up, whilst ensuring that a deflector arrangement 26, 72 is always present to divert coolant towards the inlet plane 16. In the illustrated embodiment, the second deflector arrangement 72 is of the same shape and configuration as the first deflector arrangement 26 described above. In alternative embodiments, the first and/or second deflector arrangement may be of different shape and configuration (e.g. multiple deflector members 28 rather than a single deflector plate).

In the illustrated embodiment, the jacket has a second cranked configuration 74 proximal the outlet plane 18, whereby the jacket outlet 24 is spaced apart from the core 12 in a direction perpendicular to the flow direction from the inlet plane 16 to the outlet plane 18. In this way, the jacket 20 defines a second chamber between the jacket outlet 24 and the core 12, so that coolant passes through the second chamber before leaving the core 12.

The first wall 62 of the jacket 20 is formed from a single plate (e.g. a plate pressed to form the first and second offset regions 68, 74). This means that there are no joints between regions of the first wall 62, which provides for simple assembly and sealing of the jacket 20.

The jacket 20 has a second wall 76 and side plates 78 connecting the first and second walls 62, 76. Such a jacket 20 arrangement is useful for assembly, since the walls 62, 76 and side plates 78 can each be positioned around the core 12 prior to connecting together (e.g. via brazing).

In the illustrated embodiment, the first and second walls 62, 76 each have tabs 80 configured for connection to the side plates 78. These tabs 80 provide an increased contact area between the walls 62, 76 and side plates 78, which makes it easier to connect them together (e.g. via brazing). In alternative embodiments, the tabs 80 may be omitted.

The heat exchanger also includes a header plate 82 having a central region 84 defining an array of apertures in which the tubes 14 are received and an edge region 86 circumferential to the central region 84. The edge region 86 includes an engagement formation for connection to a first end of the jacket 20, as will be described in more detail below in relation to FIGS. 4 and 5.

In the embodiment of FIG. 4, the engagement formation is defined by a flange 88 configured to extend over a first end of the jacket 20. This ensures that the first end of the jacket 20 is effectively received within the header plate 82, which helps to keep the walls 62, 76 and side plates 78 in the correct position prior to fixing them together (e.g. via brazing). Furthermore, the flange 88 provides a greater contact area between the jacket 20 and the header plate 82 than would be provided by a flat header plate 82. This provides a stronger connection when the header plate 82 and jacket 20 are connected (e.g. via brazing).

Figure 5:
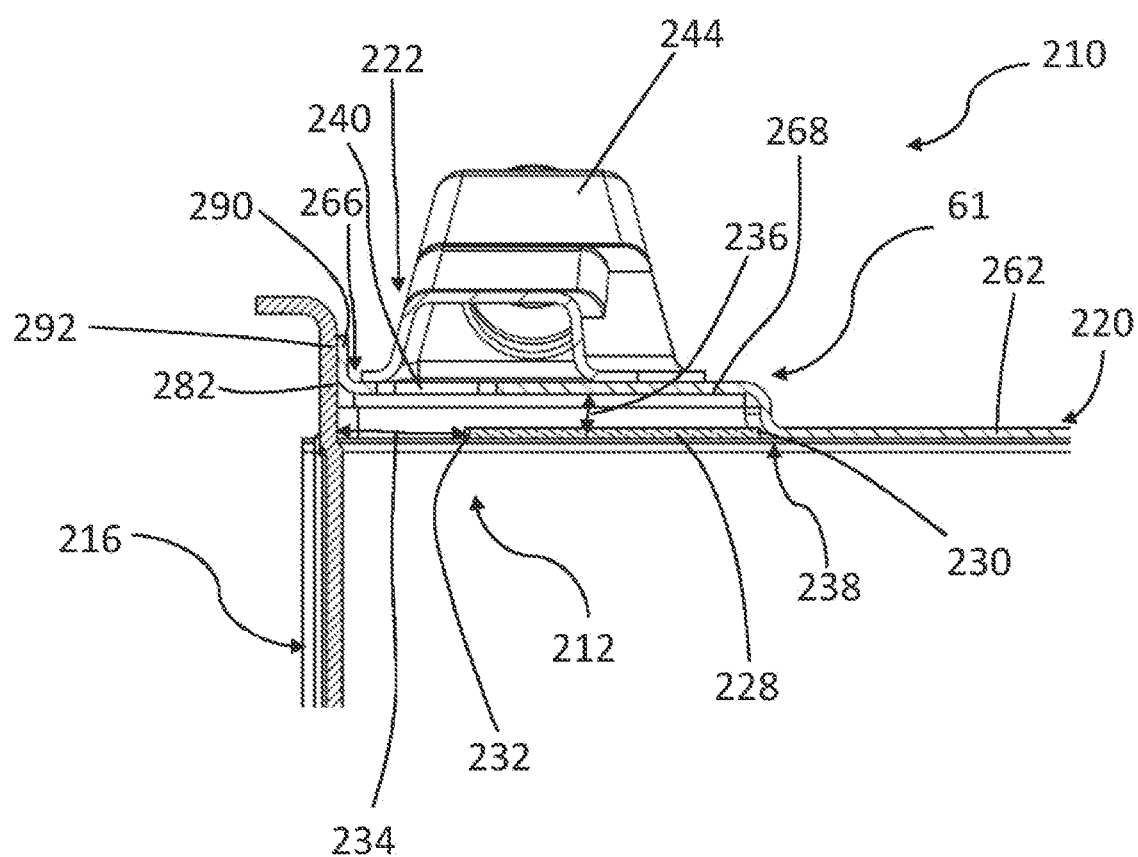
FIG. 5 is a cross section of an inlet portion of a heat exchanger according to a further embodiment.

Referring now to FIG. 5, a cross section of an inlet portion of a heat exchanger 210 according to a further embodiment is shown. Corresponding components between the heat exchanger of FIGS. 1 to 4 are labelled with the prefix "2". In this embodiment, the first end of the jacket 220 includes a jacket flange 290 extending parallel to the inlet plane 216 and the engagement formation of the header plate 282 is an abutment surface 292 configured for abutment with the jacket flange 290 of the jacket 220. This provides a greater contact area between the jacket 220 and the header plate 282 than would be provided by a straight-ended jacket 220, which provides a stronger connection when the header plate 282 and jacket 220 are connected (e.g. via brazing). The jacket flange 290 may be provided around the circumference of the first end of the jacket 220. In alternative embodiments, a plurality of jacket flanges are spaced apart from each other and distributed around a circumference of the first end of the jacket 220 (e.g. a different jacket flange 290 provided on each wall of the jacket 220). In the illustrated embodiment, the portion of the jacket flange 290 along the jacket first wall 262 (or each jacket flange 290 of the first wall 262) extends from the first offset region 268 of the first wall 262 in a direction away from the core-jacket interface plane 238. In alternative embodiments, the portion of the jacket flange 290 along the jacket first wall 262 (or each jacket flange 290 of the first wall 262) may extend from the first offset region 268 of the first wall 262 in a direction towards the core-jacket interface plane 238.

In either of the embodiments of FIGS. 4 and 5, the header plate 82, 282 is a first header plate, and a second header plate is provided at an opposite end of the tubes 14 to the first header plate 82, 282 (e.g. as shown in FIGS. 1 and 2). The second header plate may be of the same shape and configuration as the first header plate 82, 282, or may be of different shape and configuration (e.g. the first header plate may be of the type depicted in FIG. 5, and the second header plate may be of the type depicted in FIG. 4, or vice versa). Once the jacket 20, 220 is assembled around the core 12, 212, braze joints are formed between: the first wall 62, 262 and the side plates 78; the second wall 76 and the side plates 78; the first header plate 82, 282 and the jacket 20, 220; and the second header plate and the jacket 20, 220. This fixes the jacket 20, 220 and header plates 82, 282 in position around the core 12, 212, and seals the jacket 20, 220 to prevent leaking of coolant from the jacket 20, 220.

Referring again to FIGS. 1 and 2, the jacket inlet 22 is elongate and extends across the width of the core 12, as will be described in more detail below. This ensures the coolant is directed via the deflector arrangement 26 to the entire width of the inlet plane 16, and increases the heat transfer capabilities over a heat exchanger with a shorter jacket inlet.

As mentioned above, the jacket inlet 22 includes a plurality of inlet apertures 40 distributed across the width of the core 12. The plurality of tubes 14 spaced apart from one another define a series of tube gaps 42 therebetween, and the inlet apertures 40 are aligned with the tube gaps 42. This ensures that the coolant is directed via the deflector member 28 to each of the tube gaps 42 proximal the inlet plane 16 (i.e. there are no tube gaps 42 which do not receive sufficient coolant) which reduces the likelihood of boiling coolant close to the inlet plane 16. In alternative embodiments, a single elongate inlet aperture 40 extending across the width of the core 12 may be provided instead of multiple inlet apertures 40. In alternative embodiments, a plurality of inlet apertures 40 may be provided and at least some of these inlet apertures may overlap two or more tube gaps 42.

In the illustrated embodiment, the jacket inlet 22 includes a coolant channel 44 configured to be aligned with the inlet apertures 40. The coolant channel 44 has a first channel end 46 including a channel opening 50, and a second channel end 48, and the depth of the coolant channel 44 decreases from the first channel end 46 to the second channel end 48. This ensures an even flow velocity of the coolant along the channel 44 as the flow volume of the coolant in the channel 44 reduces due to coolant entering the core 12 via the inlet apertures 40. This ensures a similar velocity of coolant flow across the width of the core 12. In alternative embodiments, the coolant channel 44 may be of different shape and configuration (e.g. the coolant channel 44 may have a constant depth).

In the illustrated embodiment, the heat exchanger 10 also includes a hot fluid inlet tank 52 proximal the inlet plane 16 and a hot fluid outlet tank 54 proximal the outlet plane 18. The tubes 14 provide a fluid communication between the hot fluid inlet tank 52 and the hot fluid outlet tank 54. The hot fluid inlet tank 52 defines a first tank end 56 having a tank opening 60 and a second tank end 58, and the depth of the hot fluid inlet tank 52 decreases from the first tank end 56 to the second tank end 58. Having the depth of the hot fluid inlet tank 52 decreasing from the first tank end 56 to the second tank end 58 ensures an even flow velocity of the hot fluid along the tank 52 as the flow volume of the hot fluid in the tank 52 reduces due to the hot fluid entering the core 12 via the tubes 14. This ensures a similar flow rate of hot fluid in each of the tubes 14 proximal the inlet plane 16, which (when combined with an even flow of coolant across the width of the core 12) ensures a consistent heat transfer from the hot fluid to the coolant across the width of the core 12, and reduces the chances of coolant boiling close to the inlet plane 16.

In the illustrated embodiment, the hot fluid outlet tank 54 is of the same shape and configuration as the hot fluid inlet tank 52. This provides for simple assembly of the heat exchanger 10, since the inlet/outlet tanks 52, 54 are interchangeable. In alternative embodiments, the hot fluid inlet tank 52 and/or hot fluid outlet tank 54 may of a different shape and configuration (e.g. on or both tanks 52, 54 may have a constant depth).

The heat exchangers 10, 210 described above are charge air coolers (i.e. the hot fluid is charge air). Specifically, the heat exchangers 10, 210 are water cooled charge air coolers (i.e. the coolant is a water-based coolant). Typical water-based coolant used in this type of application include water/glycol mixtures and/or water with rust inhibitors or other additives. Water-based coolants typically have a boiling temperature of around 100° C. to 128° C. (depending on additives and pressure). This is lower than typical peak charge air temperatures which are around 150° C. to 270° C. Therefore, the advantages outlined above are of particular relevance to this type of heat exchanger 10, 210. In alternative embodiments, the heat exchangers 10, 210 may be used for other applications (e.g. cooling of industrial fluids).

The heat exchangers 10, 210 described above are of metallic material, which provides good heat transfer (e.g. via thermal conduction), strength and durability, and makes them suitable for use with high temperature fluids. Specifically, the heat exchangers 10, 210 are of aluminium material—a lightweight metallic material, which is particularly suitable for heat exchangers for automotive applications, where weight savings lead to increased fuel efficiency. In alternative embodiments, the heat exchangers 10, 210 may be of non-metallic material.

Although the present disclosure has been described in relation to one or more embodiments, it will be appreciated that various changes or modifications can be made without departing from the scope of the present disclosure as defined in the appended claims. For example:

- the deflector arrangement 26 may include a plurality of deflector members 28 rather than a single deflector plate (e.g. a plurality of deflector members 28 each corresponding to one of the tube gaps 42, or a plurality of deflector members 28 each overlapping two or more tube gaps 42);
- the jacket outlet 24 may be of different configuration to the jacket inlet 22 (e.g. the second offset region 74 and second deflector arrangement 72 may be omitted);
- the header plate 82, 282 may be connected to the jacket 20, 220 via a different type of engagement formation to that shown in FIGS. 4 and 5;
- the hot fluid inlet and outlet tanks 52, 54 may be of different shape and configuration;
- the coolant channel 44 may be of different shape and configuration;
- the deflector member 28, 228 may not be flush with the core-jacket interface plane 38, 238 (e.g. it may be positioned between the first offset region 68, 268 and the core-jacket interface plane 38, 238);
- a single elongate inlet aperture 40 may be provided instead of a plurality of inlet apertures 40;
- the first wall 62, 262 of the jacket may be formed from multiple pieces rather than a single piece;
- the first wall 62, 262, side plates 78 and second wall 76 of the jacket 20, 220 may be formed from a single piece (e.g. a sleeve configured to slide over the tubes 14 of the core 12);
- the first fluid may be a coolant and the second fluid may be a hot fluid; and
- the heat exchanger may be of non-metallic material.

What is claimed is:

1. A heat exchanger comprising:
   a core having a plurality of tubes, each tube having a tube inlet and a tube outlet, wherein the tube inlets define an inlet plane and the tube outlets define an outlet plane, wherein the core is configured to transfer a first fluid in a flow direction from the inlet plane to the outlet plane via the plurality of tubes, and wherein the tubes are spaced from one another for receiving a second fluid therebetween, for heat transfer between the first and second fluids;

a jacket provided adjacent the core for use in containing the second fluid, wherein the jacket comprises a jacket inlet for passage of the second fluid en route to the core and a jacket outlet for expelling the second fluid from the core, wherein the jacket extends between the inlet plane and the outlet plane, and wherein the jacket inlet is offset from the inlet plane towards the outlet plane; and a deflector arrangement for directing a flow of the second fluid from the jacket inlet towards the inlet plane prior to entering the core, wherein the deflector arrangement defines one or more core openings through which second fluid is intended to flow in order to enter the core, the jacket inlet comprises one or more inlet apertures upstream of said core openings, and the one or more core openings are arranged to be at least partially offset from the one or more inlet apertures in a direction towards the inlet plane.

2. A heat exchanger according to claim 1, wherein the deflector arrangement comprises one or more deflector members provided between the jacket inlet and the core.

3. A heat exchanger according to claim 2, wherein the core defines a height parallel to a flow axis of the tubes and a width transverse to said flow axis of the tubes, and wherein the deflector arrangement is arranged such that the second fluid is influenced in the direction of the inlet plane as it flows from the jacket inlet across substantially the entire width of the core.

4. A heat exchanger according to claim 3, wherein the one or more deflector members comprise a deflector plate extending across the width of the core.

5. A heat exchanger according to claim 1, wherein the deflector arrangement defines one or more core openings through which second fluid is intended to flow in order to enter the core, and wherein the jacket inlet comprises one or more inlet apertures upstream of said core openings, wherein the one or more core openings are arranged to be at least partially offset from the one or more inlet apertures in a direction towards the inlet plane, wherein the one or more deflector members each comprise a fixed end and a free end, wherein the fixed end is connected to the jacket, and wherein said one or more core openings are defined between the or each free end and the inlet plane so that a flow of second fluid is directed to the core through said one or more core openings; optionally, wherein the distance between the or each free end and the inlet plane is in the range of 5 mm to 25 mm.

6. A heat exchanger according to claim 1, wherein the deflector arrangement defines one or more core openings through which second fluid is intended to flow in order to enter the core, and wherein the jacket inlet comprises one or more inlet apertures upstream of said core openings, wherein the one or more core openings are arranged to be at least partially offset from the one or more inlet apertures in a direction towards the inlet plane, wherein the deflector arrangement comprises one or more deflector members provided between the jacket inlet and the core, wherein the one or more deflector members comprise one or more deflector apertures or slits, wherein the one or more deflector apertures or slits define said one or more core openings.

7. A heat exchanger according to claim 1, wherein the deflector arrangement defines one or more core openings through which second fluid is intended to flow in order to enter the core, and wherein the jacket inlet comprises one or more inlet apertures upstream of said core openings, wherein the one or more core openings are arranged to be at least partially offset from the one or more inlet apertures in a direction towards the inlet plane, wherein the deflector arrangement comprises one or more deflector members provided between the jacket inlet and the core, wherein the or each deflector member is arranged in sealing contact with the core for preventing second fluid entering the core other than through said one or more core openings.

8. A heat exchanger according to claim 1, wherein the deflector arrangement defines one or more core openings through which second fluid is intended to flow in order to enter the core, and wherein the jacket inlet comprises one or more inlet apertures upstream of said core openings, wherein the one or more core openings are arranged to be at least partially offset from the one or more inlet apertures in a direction towards the inlet plane, wherein the deflector arrangement comprises one or more deflector members provided between the jacket inlet and the core, wherein the or each deflector member comprises a fixed end connected to the jacket and a second end, wherein the or each deflector member defines a core interface surface between said fixed and second ends, and wherein said core interface surface is in abutment with the core for preventing the second fluid entering said core away from said one or more core openings.

9. A heat exchanger according to claim 1, wherein the deflector arrangement defines one or more core openings through which second fluid is intended to flow in order to enter the core, and wherein the jacket inlet comprises one or more inlet apertures upstream of said core openings, wherein the one or more core openings are arranged to be at least partially offset from the one or more inlet apertures in a direction towards the inlet plane, wherein the deflector arrangement comprises one or more deflector members provided between the jacket inlet and the core, wherein the one or more deflector members each comprise a fixed end and a free end, wherein the or each fixed end is connected to the jacket, and wherein the or each free end is profiled to direct a flow of the second fluid from the jacket inlet towards the inlet plane.

10. A heat exchanger according to claim 1, wherein the deflector arrangement defines one or more core openings through which second fluid is intended to flow in order to enter the core, and wherein the jacket inlet comprises one or more inlet apertures upstream of said core openings, wherein the one or more core openings are arranged to be at least partially offset from the one or more inlet apertures in a direction towards the inlet plane, wherein the deflector arrangement comprises one or more deflector members provided between the jacket inlet and the core, wherein the one or more deflector members each comprise a fixed end and a free end, wherein the or each fixed end is connected to the jacket, and wherein the or each free end is profiled to improve uniformity of second fluid flow distribution across said core.

11. A heat exchanger according to claim 1, wherein the deflector arrangement comprises one or more deflector members provided between the jacket inlet and the core, and wherein the heat exchanger is configured to define a gap between the jacket inlet and the one or more deflector members.

12. A heat exchanger according to claim 1, wherein the core defines a height extending in a direction parallel to a flow axis of the tubes and a width extending transverse to said flow axis, and wherein the jacket inlet is elongate and extends across the width of the core.

13. A heat exchanger according to claim 12, wherein the jacket inlet comprises a plurality of inlet apertures distributed across the width of the core, or a single inlet aperture extending across the width of the core; optionally, wherein the plurality of tubes spaced from one another define a series of tube gaps therebetween, and wherein said plurality of inlet apertures are aligned with said tube gaps.

14. A heat exchanger according to claim 1, wherein said jacket has a cranked configuration proximal the inlet plane, whereby the jacket inlet is spaced apart from the core in a direction perpendicular to said flow direction such that the jacket defines a chamber between the jacket inlet and the core, so that second fluid passes through said chamber before entering the core; optionally, wherein said cranked configuration defines a shoulder or step in an outer surface of the jacket.

15. A heat exchanger according to claim 14, wherein a core-jacket interface plane is defined between the core and the jacket, wherein the jacket comprises a first wall, the first wall comprising a planar surface configured to be positioned adjacent said core-jacket interface plane, wherein the first wall further comprises a first cranked region which defines said chamber between the core jacket interface plane and the jacket inlet.

16. A heat exchanger according to claim 15, wherein the jacket outlet is provided at a second end of the first wall, wherein the jacket outlet is of the same shape and configuration as the jacket inlet; optionally, further comprising a second deflector arrangement proximal the jacket outlet; optionally, wherein said jacket has a cranked configuration proximal the outlet plane, whereby the jacket outlet is spaced apart from the core in a direction perpendicular to said flow direction such that the jacket defines a second chamber between the jacket outlet and the core, so that second fluid passes through said second chamber before leaving the core.

17. A heat exchanger according to claim 15, wherein the first wall of the jacket is formed from a single plate.

18. A heat exchanger according to claim 1, wherein the heat exchanger is a charge air cooler, and wherein said first fluid is charge air; optionally, wherein the heat exchanger is a water cooled charge air cooler, and wherein said second fluid is a water-based coolant (e.g. a water/glycol mixture and/or water with rust inhibitors).

19. A heat exchanger according to claim 1, wherein the heat exchanger is of metallic material; optionally, wherein the heat exchanger is of aluminium material.

\* \* \* \* \*